(12) United States Patent
Forster (10) Patent No.: US 7,443,299 B2
(45) Date of Patent: Oct. 28, 2008

(54) EXTENDED RANGE RFID SYSTEM

(75) Inventor: Ian J. Forster, Chelmsford (GB)

(73) Assignee: Avery Dennison Corporation, Pasadena, CA (US)

( * ) Notice: Subject to any disclaimer, the term of this patent is extended or adjusted under 35 U.S.C. 154(b) by 486 days.

(21) Appl. No.: 11/247,512

(22) Filed: Oct. 11, 2005

(65) Prior Publication Data

US 2006/0028344 A1    Feb. 9, 2006

Related U.S. Application Data

(63) Continuation of application No. PCT/US2004/012328, filed on Apr. 22, 2004.

(30) Foreign Application Priority Data

Apr. 25, 2003 (GB) .................... 0309498.4

(51) Int. Cl.
*G08B 13/14* (2006.01)
(52) U.S. Cl. .................. 340/572.7; 340/572.8; 343/878; 369/273
(58) Field of Classification Search .............. 340/572.7, 340/572.8, 572.1, 10.1; 343/878; 369/273, 369/283–286
See application file for complete search history.

(56) References Cited

U.S. PATENT DOCUMENTS

| 5,699,047 | A | 12/1997 | Tsai et al. |
| 5,825,292 | A | 10/1998 | Tsai et al. |
| 5,939,985 | A | 8/1999 | Tsai et al. |
| 6,044,046 | A * | 3/2000 | Diezmann et al. ........... 369/273 |
| 6,097,291 | A | 8/2000 | Tsai et al. |
| 6,373,799 | B1 * | 4/2002 | Ono et al. .................. 369/52.1 |
| 2002/0175818 | A1 | 11/2002 | Forster et al. |
| 2004/0052203 | A1 * | 3/2004 | Brollier ....................... 369/273 |
| 2004/0251541 | A1 | 12/2004 | Arneson et al. |
| 2006/0028344 | A1 | 2/2006 | Forster |

FOREIGN PATENT DOCUMENTS

| DE | 101 12 899 | 10/2002 |
| EP | 0 996 124 A1 | 4/2000 |
| EP | 1 302 893 | 4/2003 |
| WO | WO 00/23994 | 4/2000 |
| WO | WO 2004/046762 | 6/2004 |
| WO | WO 2005/076205 | 8/2005 |
| WO | WO 2005/076206 | 8/2005 |

* cited by examiner

*Primary Examiner*—Thomas J Mullen
(74) *Attorney, Agent, or Firm*—Renner, Otto, Boisselle & Sklar, LLP (57) ABSTRACT

A radio frequency identification (RFID) system for discs such as CDs, DVDs or minidiscs includes a special RFID transponder and antenna configuration. The discs normally include an outer metallized annular zone where information is stored, a central hole, and an inner annular zone between the hole and the outer annular zone. The transponder may be located in the inner annular zone, with antenna elements coupled to the transponder extending in opposite directions part way across the outer annular zone. Multilayer labels with a recess for the transponder chip, and antenna elements formed by conductive material may be employed to apply the RFID assembly to the discs. A monopole or dipole mode of antenna operation, prominently involving the metallized disc layer, results from the antenna configuration, and serves to more than double the range of the system.

30 Claims, 8 Drawing Sheets

EXTENDED RANGE RFID SYSTEM

This is a continuation of International Application No. PCT/US04/12328, filed Apr. 22, 2004, published in English as WO 2004/097731. The above application is hereby incorporated by reference in its entirety. International Application No. PCT/US04/12328 claims priority from UK application GB 0309498.4, filed Apr. 25, 2003.

TECHNICAL FIELD OF THE INVENTION

This invention relates to RFID systems, primarily for use with Compact Discs (CDs), Digital Versatile or Video Discs (DVDs) or Mini Discs.

BACKGROUND OF THE RELATED ART

It has previously been proposed to use Radio Frequency Identification (RFID) transponders with CDs or DVDs, and U.S. Patent Publication No. US2002/0175818A1 discloses such a device in FIGS. 18 and 19. However, the disclosed device includes a central conductive area spaced apart from the normal conductive area by a narrow peripheral slot, so that the primary antenna configuration is that of a fairly small slot antenna, with severely limited range. The configuration also employs conducting tabs which extend to the periphery of the disc, but the predominant radiation is from the relatively small area slot antenna.

SUMMARY OF THE INVENTION

Accordingly, a principal object of the present invention is to significantly increase the range of disc type RFID systems.

Another object of the invention is to provide a practical commercially viable label system for implementing disc type RFID antennas and associated transponders.

In accordance with one illustrative embodiment of the invention, a disc type RFID system may include an outer conventional conducting annular zone with conventional visual, audio or digital information thereon, two dipole elements each extending part way across the conducting annular zone, a transponder element interconnecting the two dipole elements, and with a conducting structure interconnecting the dipoles, covering only a small portion such as a minor fraction of the area of the disc within the annular information zone of the disc.

In operation, the embodiments act like a folded dipole antenna at lower UHF frequencies such as 915 megahertz (MHz) and as a form of monopole or dipole antenna at higher (SHF) frequencies such as 2.45 gigahertz (GHz). With both of these configurations, the conventional information bearing annular conducting zone forms part of the large area radiating structure, with the result that the range of the transponder system is increased by two or three times the range of the prior art arrangements.

In accordance with another aspect of the invention, antenna may be formed by conductive paint such as silver paint, applied to a multilayer label, and the label may be printed with conductive paint or ink and visual material prior to application to the CD disc. More specifically, the label may include a release coated liner sheet and an overlying intermediate sheet, with pressure sensitive adhesive between the two sheets, and an opening to receive the transponder. The antenna elements may be printed on the second sheet and electrically coupled to the transponder. The label is completed with the addition of a thin face stock sheet which covers the antenna and transponder, and which may include the usual advertising and information about the contents of the disc. Incidentally, the antenna elements may be included in the label in any convenient way, by conductive ink, paste or paint, by an etching process or by die cutting a thin conductive sheet, for examples.

More than one CD label of this configuration may be included on a single master sheet and fed through a printer, such as an ink jet or laser printer. Following printing, the individual multi-layer CD labels may be separated from the master sheet, and applied to the CD or DVD following removal of the release coated liner sheet and exposure of the pressure sensitive adhesive. Alternatively, the CD labels may be produced in roll form, by roll-to-roll processing.

Advantages of the present disc antenna configuration include substantial extension of the coupling range, and the provision of a consistent radiation coupling pattern. In this regard the radiation coupling pattern of the prior art device, with its circular radiation slot, was not clearly defined and included null zones; while the antenna radiation pattern of the present design is free of these problems. In addition, the range of an antenna is dependent to a substantial degree on size, and the above described prior art device has a relatively small diameter peripheral slot as the main radiation structure, while the present antenna structural configurations essentially extend the radiating antenna to the entire outer conductive zone of the disc.

In accordance with another aspect of the invention, an RFID system includes: a disc having a conductive layer in an outer annular zone, a central mounting opening and an inner annular zone between said central opening and said outer conductive annular zone; a transponder mounted on said disc; antenna elements mounted on said disc and extending in opposite directions, said antenna elements being electrically coupled to said transponder; and said inner annular zone being free of conductive material in that portion of said inner annular zone adjacent said conductive layer in said outer zone. Radiant energy is coupled to and from said disc primarily from said antenna elements and said conductive outer annular zone.

In accordance with yet another aspect of the invention, an RFID system includes: a disc having a conductive layer in an outer annular zone, a central mounting opening, and an inner annular zone between said central opening and said outer conductive annular zone; a transponder mounted on said disc in said inner annular zone; antenna elements extending in opposite directions, electrically coupled to said transponder; said antenna elements extending outward and terminating between one quarter and three quarters of the way across said outer annular zone; and said inner annular zone having the greater part of its area free of conductive material. Radiant energy is coupled to and from said disc primarily from said antenna elements and said conductive outer annular zone.

In accordance with still another aspect of the invention, an RFID label is for use with a disc having a conductive layer in an outer annular zone, a central mounting opening and an inner annular zone between said central mounting opening and said outer conductive annular zone; said label including: a plurality of layers including a release coated liner; a base layer with a layer of pressure sensitive adhesive between said liner and said base layer; and a face stock layer overlying said base layer; said label having a shape corresponding to the shape of a disc, with an outer annular zone and an inner annular zone corresponding to the outer zone and the inner zone; said base layer having an opening or recess for a chip, extending through said base layer; a transponder chip mounted on said label in said opening or recess; antenna elements extending in opposite directions, electrically coupled to said transponder; said antenna elements extending outward at least part way across said outer annular zone of said label; and said antenna elements being formed of conductive material located between said base layer and said face stock layer.

In accordance with a further aspect of the invention, an RFID system includes: an annular disc having a central hole therein, and including an annular conductive material surrounding the central hole; a transponder; and antenna elements. The antenna elements are electrically coupled to the transponder. The antenna elements at least partially overlie the conductive material of the disc. The antenna elements are capacitively coupled to the conductive material. Radiant energy is coupled to and from the system primarily from the antenna elements and the annular conductive material.

In accordance with a still further aspect of the invention, a label for use with an annular disc having a central hole therein, and including inner and outer annular portion surrounding the central hole, the outer annular portion having an annular conductive material, and the inner portion being substantially free of conductive material, includes: a face stock layer; a transponder; antenna elements electrically coupled to the transponder; a base layer; and an adhesive layer attached to the base layer for adhesively coupling the label to the disc. The antenna elements and the transponder are between the adhesive layer and the face stock layer.

In accordance with another aspect of the invention, an RFID system includes an annular disc that includes: an inner annular portion surrounding a central hole; and an outer annular portion surrounding the inner annular portion; and a transponder. The outer annular portion includes an annular conductive material. The transponder is electrically coupled to the annular conductive material, such that the annular conductive material functions as at least part of an antenna structure in conjunction with the transponder.

Other objects, features and advantages will become apparent from a consideration of the following detailed description and from the accompanying drawings.

BRIEF DESCRIPTION OF THE DRAWINGS

In the annexed drawings, which are not necessarily to scale.

DETAILED DESCRIPTION

Before describing the drawing figures, certain background information will be noted. Specifically, the well-known relationship between frequency and wavelength may be noted as follows:

$$L=c/F \qquad (1)$$

$$F=c/L \qquad (2)$$

where L is the wavelength, c is the speed of light or electrical signals, equal to about $3 \times 10^{10}$ centimeters per second, and F is the frequency. Using formula (1) set forth above, with a frequency of 915 MHz, the wavelength is approximately 32.78 centimeters (cm) and a half wavelength is about 16.4 cm. With a frequency of 2.45 GHz, or $2.45 \times 10^9$ Hertz, the wavelength is about 12.2 cm, and the half wavelength is about 6.1 cm. Incidentally, the frequency range of from 860 to 960 megahertz is often referenced as the UHF frequency band, and the frequency range of from 2.4 to 2.5 gigahertz or 2.4 to $2.5 \times 10^9$ Hertz is often referred to as the super high frequency (SHF) band.

It is also noted that RFID systems generally are known, and RFID transponder units are widely available from various manufacturers. For completeness and by way of background, the prior publication identified above is hereby incorporated by reference into this specification, along with U.S. Pat. No. 5,585,953 and U.S. Pat. No. 5,347,280, referenced in the prior printed publication cited hereinabove. These latter references describe various RFID systems. It may be briefly noted that RFID systems normally include a transmitter/receiver unit, and a transponder unit. In response to signals transmitted by the transmitter/receiver unit, the transponder provides a response that is processed by the transmitter/receiver unit. In one simple application, an RFID transponder, attached to a product in a store, may be subject to an interrogating signal at the exit to the store; and if the product has not been paid for, an alert signal or an alarm may be actuated. The transponder unit is preferably powered by rectifying the incoming interrogation signal, but may in some cases include a battery. Various applications other than the simple security application mentioned above may be implemented by the RFID system.

Figure 1:
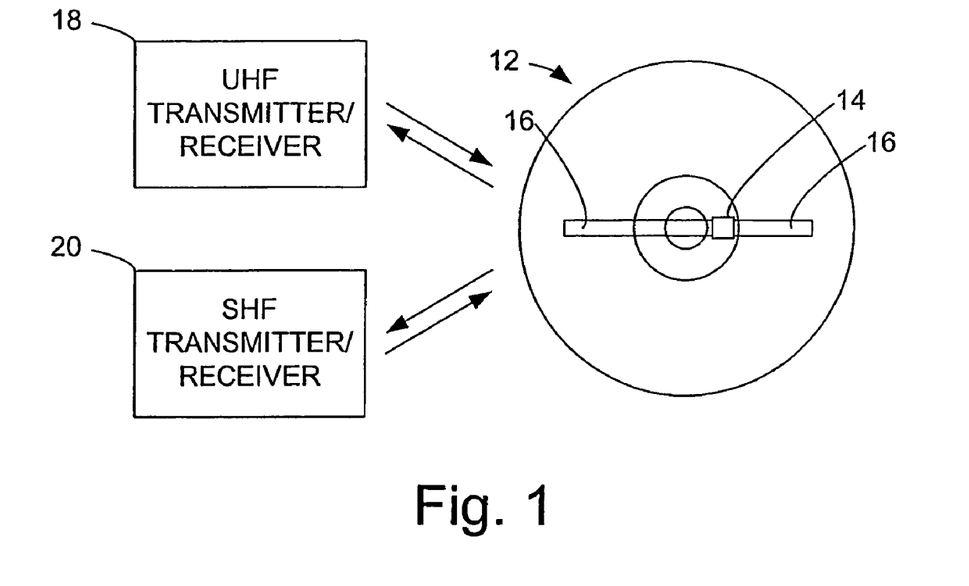
FIG. 1 is a diagrammatic showing of an RFID system for use with CD or DVD discs.

Now, referring more particularly to the drawings, FIG. 1 is a schematic overall view, showing a compact disc 12, with a transponder or chip 14 and antenna elements 16. In addition, transmitter/receiver 18 operating at a UHF frequency, and transmitter/receiver 20 operating at a SHF frequency, are shown transmitting radiant energy signals to the CD disc and receiving the triggered response from transponder element 14.

Figure 2:
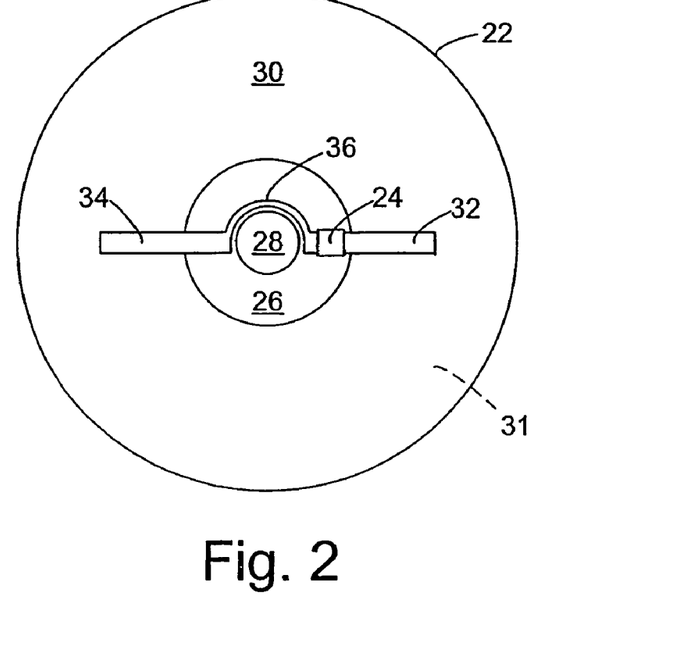
FIG. 2 is a plan view of a first embodiment disc and RFID transponder antenna construction illustrating principles of the invention.

FIG. 2 is an enlarged showing of a CD disc 22 with the label side up. The transponder or chip 24 is mounted on disc 22 in the inner zone 26, between the central mounting hole or opening 28 and the outer zone 30, which includes the conducting, information-bearing metallic zone or layer 31 of the disc 22 concealed by the label. The layer 31 is also referred to herein as an "annular conductive layer".

In FIG. 2 the two dipole elements 32 and 34 extend in opposite directions from the transponder 24. It may also be noted that the upper dipole antenna element 34 is coupled to the transponder 24 by the thin semi-circular conductor 36. The antenna elements 32 and 34 are capacitively coupled to the conductive layer that is part of the outer zone 30. Direct contact between the antenna elements 32 and 34, and the conductive layer that is part of the outer zone 30, may be prevented by a dielectric material, such as a suitable plastic, that encloses the conductive material 31 within the outer zone 30. The configuration of the antenna elements 32 and 34, and their capacitive coupling with the conductive layer 31 of the outer zone 30, allows radiant energy to be coupled to and from the disc 22 primarily from the antenna elements 32 and 34 and the conductive layer 31.

Concerning dimensions, the disc 22 is of conventional size, about 4.75 inches or almost 12 centimeters in diameter. The dipole elements are about 7 to 8 centimeters, tip to tip, and they are formed of thin strips or layers of conducting material such as copper, about 3 millimeters (about 0.125 inches) wide. The antenna elements extend about half way across the outer zone 30 of the disc 22, and they preferably terminate between about one-quarter and three-quarters of the way across the outer zone 30.

The disc 22 is described above as a CD disc of certain dimensions. However, it will be appreciated that other sorts of discs have an electrical conductive medium. Digital Versatile Discs (DVDs) are one example of an alternative disc, having substantially a metallic medium and substantially the same dimensions as a CD. Metal-based discs of other dimensions are also alternatives. One example is a minidiscs having a polycarbonate data storage medium, and an overall diameter of about 64 mm (2.5 inches). Another example is video game discs having an overall diameter of about 8 cm.

A number of different RFID transponder chips may be used, including chips sold under the names Matrics, INTERMEC, and HSL chips by Phillips. These RFID chips may have different impedances, and the associate conductive paths may be broadened or narrowed to provide improved impedance matching.

However, it is preferable not to have the connecting portion of the antenna structure occupy most of the inner area 26, or to have these connecting elements closely adjacent the outer zone 30, because if there is only a narrow gap between the antenna conducting structure and the outer conducting zone, it will form a local slot antenna of reduced size. This would detract from the desired dipole action and reduce the range of the transponder system. Accordingly, the antenna connecting structure should be close to the central hole 28 to minimize local slot type radiation.

Figure 3:
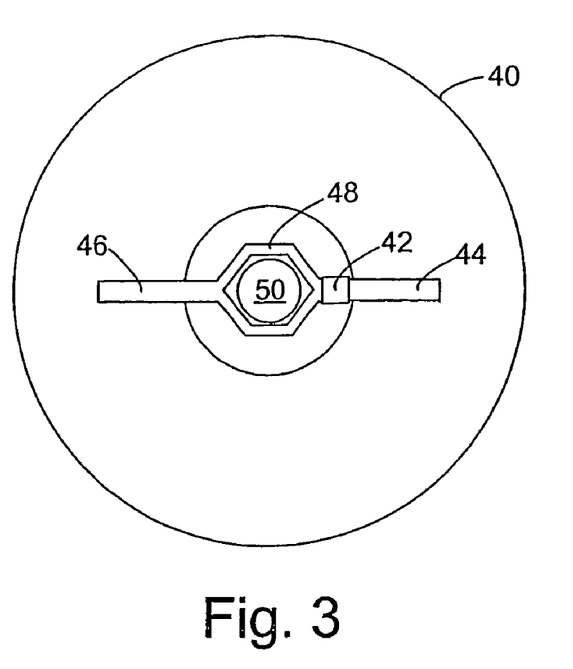
FIG. 3 is a plan view of a second embodiment disc and RFID transponder antenna construction illustrating principles of the invention.

FIG. 3 shows an alternative disc assembly 40 with an RFID chip or transponder 42 and oppositely extending dipole elements 44 and 46. The interconnection 48 between the dipole elements is hexagonal in configuration, close to the central hole 50, and providing parallel mechanically balanced paths from the RFID chip 42 to the lower dipole element 46. This type of balanced mechanical structure is desirable to avoid vibration and/or distortion during high-speed rotation of the disc as it is being read.

Figure 4:
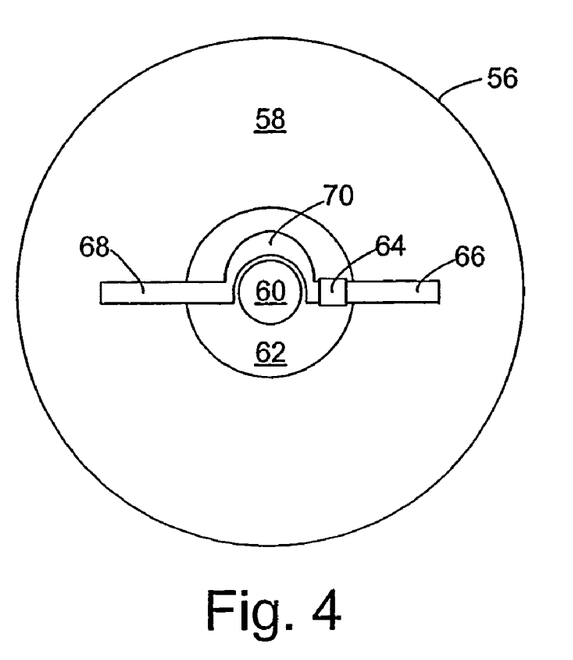
FIG. 4 is a plan view of a third embodiment disc and RFID transponder antenna construction illustrating principles of the invention.
Figure 5:
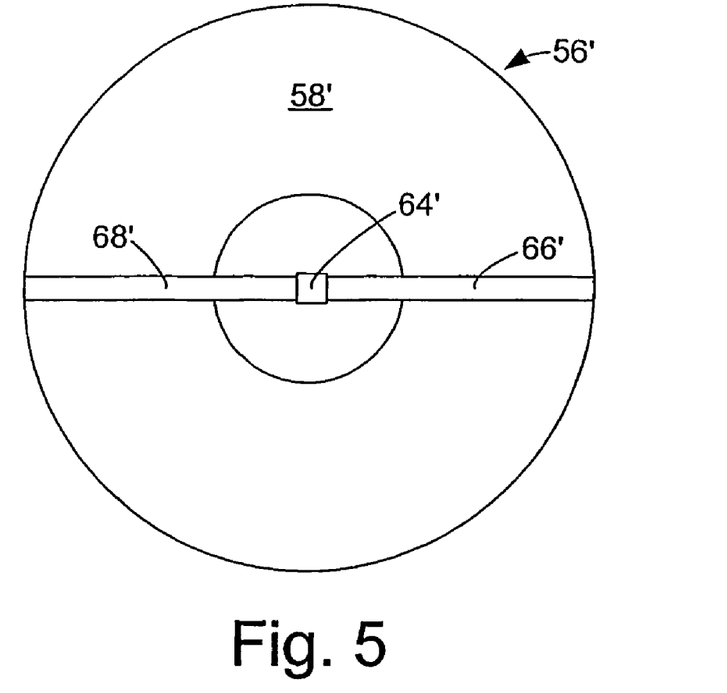
FIG. 5 is a schematic representation of operative parts of the system of FIG. 4.
Figure 6:
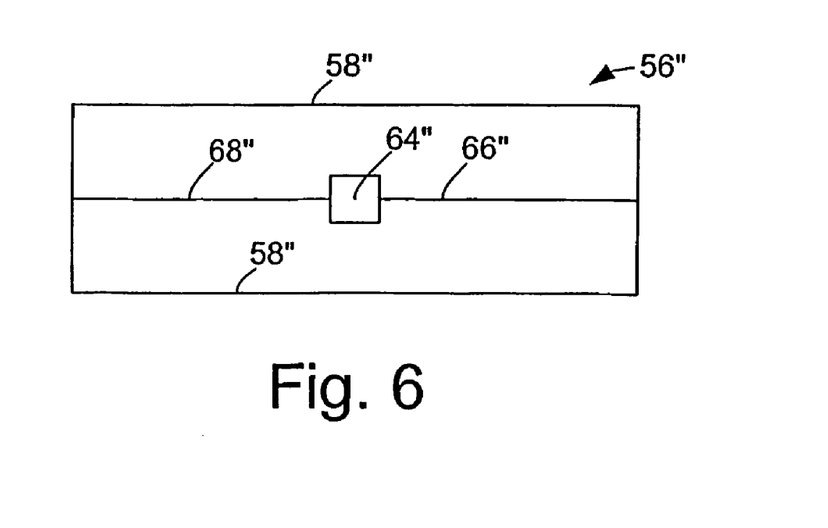
FIG. 6 is a diagram showing an equivalent circuit of the system of FIG. 4.

FIG. 4 shows a further embodiment of the invention, and FIGS. 5 and 6 are diagrams indicating the mode of operation of the RFID construction. Initially, considering FIG. 4, it shows an RFID disc assembly 56, with the disc having an outer metallized annular zone 58, a central mounting hole 60, and an inner zone or area 62 between the hole 60 and the outer metallized zone 58. The transponder chip is mounted on the inner zone 62, and has two dipole elements 66 and 68 extending in opposite directions to points about half way across the outer metallized zone 58. A generally crescent shaped conductive element 70 couples the RFID chip to the antenna element 68. The element 70 has been made to have somewhat greater area to provide a better impedance match with the RFID transponder 64, than was obtained with a plain narrow conductive strip.

Tapered shapes of varying width, such as the crescent-shape conductive element 70, may improve the bandwidth of the connection between the interconnect and an antenna element. It will be appreciated that a variety of suitable shapes having a non-uniform width may be employed. Further, it will be appreciated that interconnects having a non-uniform width may be utilized with the other embodiments described herein.

Turning now to the mode of operation, we will consider operation at UHF and at SHF frequency bands. At the UHF frequency of 915 MHz, the wavelength is about 32.78, with the half wavelength being about 16.39 centimeters. At the SHF frequency of 2.45 GHz, the wavelength is about 12.24 cm and the half wavelength is about 6.12 cm.

It is also noted that a normal dipole antenna (in the absence of supplemental conducting material or significant deviations from physical linearity) is one-half wavelength in length.

Considering first the SHF interrogation signal at the 2.45 GHz frequency, the half wavelength is about 6.12 centimeters. In the arrangements of FIG. 4 the tip-to-tip distance of the dipole elements was about 7 cm, with (the disc being about 11 cm in diameter. Under these conditions, and in the presence of the capacitively coupled outer metallized zone, good coupling between the RFID elements and the external transmitter/receiver was obtained.

In the case of the lower frequency UHF signals a double folded dipole mode of operation was achieved, with the half wavelength of 16 plus centimeters being accommodated by the folded dipole effect obtained by the capacitive coupling of the antenna elements to the metallized outer zone of the disc.

FIGS. 5 and 6 indicate what is believed to be the mode of operation of the antenna system of FIG. 4 at the lower UHF frequency, with corresponding elements being designated by primed reference numerals in FIG. 5 and by double primed elements in FIG. 6. The showing of FIG. 6 is a double version of a conventional folded dipole structure and provides good extended range coupling to the transmitter/receiver, and good impedance matching to the RFID chip. Incidentally, the radiation pattern of the embodiments of FIGS. 2-4 is essentially a simple major lobe with maximum reduction coupling substantially along the axis perpendicular to the centre of the disc.

Figure 7:
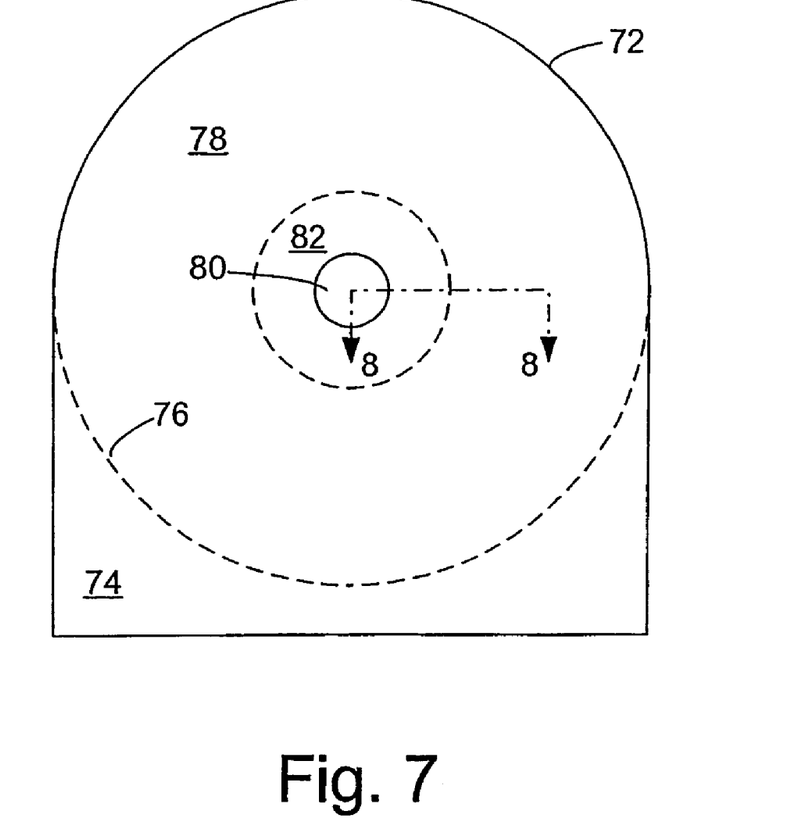
FIG. 7 is a plan view of a multi-layer label construction for implementing the RFID constructions shown in FIGS. 2-4.
Figure 8:
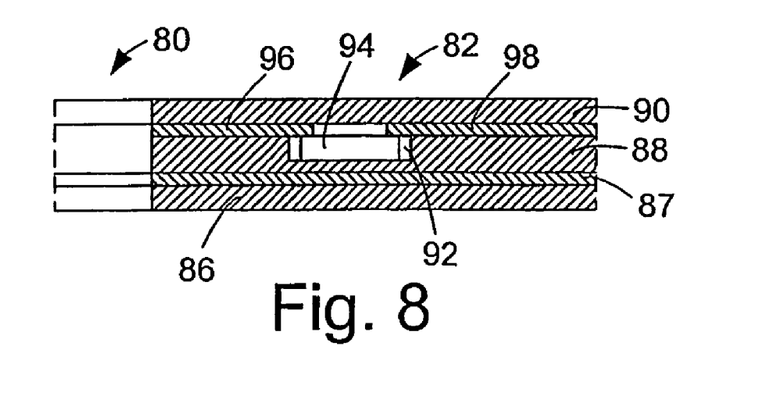
FIG. 8 is a cross-sectional view along line 8-8 of FIG. 7.

FIGS. 7 and 8 show a multiple layer label which may be employed to implement the RFID system of FIGS. 1 through 6 of this specification, as well as other embodiment RFID systems described below. Incidentally the overall label outline configuration of FIG. 7 is shown in U.S. Pat. No. 5,715,934. In FIG. 7, the label includes the central label area and the locating area 74 secured to the main label area 72 by perforations. The main area 72 has pressure sensitive or other suitable adhesive thereon, which is exposed when a release-coated liner is removed; and the area 74 of the label has no exposed adhesive so that it may be employed to locate the label from the enclosing CD box, and then separate therefrom along perforations 76.

The main label 72 has areas corresponding to those of a CD or DVD, with an outer annular area 78 corresponding to the metallized layer of a CD or DVD, a central hole or opening 80, and an inner annular area 82 between the hole an the outer area 78.

FIG. 8 is a partial cross-sectional view taken along lines 8-8 of FIG. 7. In FIG. 8 the lower layer 86 is a release layer covering an adhesive layer 87, and the two other layers of the multilayer label include a base layer 88 and the top or face stock layer 90. The base layer 88 has a recess or die cut opening 92 and an RFID transponder 94 is mounted in the recess. Antenna elements 96 and 98 preferably formed of conductive ink, paint or paste, are connected to the chip or transponder 94 and extend in opposite directions from the chip as disclosed in FIGS. 2 through 4 of the drawings. The face stock sheet 90 may be adhesively bonded to the base layer 88. Instead of using conductive ink, paint or paste, the antenna elements may be formed by die cutting a thin conductive sheet, by etching or by alternative deposition methods.

As noted above, the adhesive layer 87 may include a pressure sensitive adhesive. Alternatively, other types of adhesives may be used in the adhesive layer 87. Examples of other types of adhesives include suitable epoxies, hot melt adhesives, and cyanocrylates. It may be advantageous for the adhesive to be strong enough to bond the label 72 to the disc permanently, such that removal of the label may involve destruction of the disc. Effectively permanent coupling of the label to the disc may be advantageous where there is concern about attempts to remove the label or render it unreadable, such as when RFID system is being used as an anti-theft device, for instance.

Conversely, it may be advantageous in other applications for all or part of the label 72 to be adhered using a low tack, low residue adhesive, such as the adhesive used in POST-IT brand notes. For instance, either the entire label 72, or the portion of the label 72 containing the transponder 94, may be easily removable without damage to or residue on the underlying disc. It may be advisable to have all or part of the label 72 be removable for various applications of the RFID system, such as for stock control, anti-theft, and anti-counterfeiting applications.

It is preferable that the multilayer label 72 be fairly thin, less than 0.38 mm (0.015 inches) thick, and preferably less than 0.30 mm (0.012 inches) thick, for ease in feeding through a laser or ink jet printer to provide visual information on the face stock layer 90. It is contemplated that more than one label could be mounted on a master sheet, imprinted in a printer, and then separated and applied to CDs. With the new RFID chips being very thin, only 0.2 mm (0.008 inches) or less thick, the multilayer label sheets with the RFID chip in place, could be printed with the chip as part of the assembly.

It will be appreciated that, as an alternative to being parts of a label, the transponder, antenna elements, and other components of the RFID system may be incorporated in a disc, for example in the disc manufacturing process. As background, compact discs are typically made of multiple separate layers. First is a soft clear plastic layer that provides a majority of the disc's thickness and weight. The layer protects the data layer from damage on the play side, and acts a lens to focus light on the data layer. Second is the data layer that is molded or pressed onto the clear plastic layer. A reflective metallic layer is located on top of the data layer, and allows the disc to function like a mirror, reflecting back laser light that has passed through the data layer. This metallic layer is the annular conductive layer referred to elsewhere herein. A fourth layer, a thin, hard protective plastic coating, is provided on the reflective metallic layer to provide strength and protection, and to provide a surface upon which a label layer may be printed. The label layer may contain text, graphics, or pictorial elements.

The various configurations for the antenna elements, transponders, and interconnections described herein may be included in a disc as part of the manufacturing process of the disc. For instance, the antenna elements and interconnect may be printed in conductive ink on the hard plastic coating of the disc, with the transponder placed appropriately to couple it to antenna elements and the interconnect. The transponder placed in the disc may be part of a thin strap or interposer, with conductive leads that couple to the interconnect and/or the antenna elements.

Figure 9:
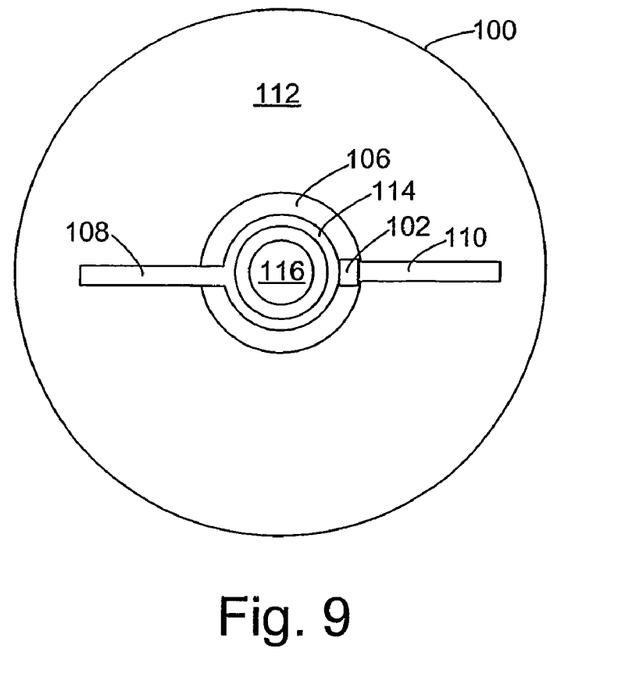
FIG. 9 is a plan view of another embodiment disc and RFID transponder antenna configuration in accordance with the present invention.

FIG. 9 shows another alternative configuration, with a disc 100 having an RFID transponder or chip 102 on an inner annular portion 106 of the disc 100. A pair of antenna elements 108 and 110 are coupled to the chip 102, and extend onto an outer annular portion 112 of the disc 100. As with the other embodiments described herein, the extension of the antenna elements 108 and 110 onto the outer portion 112 operatively couples the antenna elements 108 and 110 to the metallized part of the outer portion 112.

An interconnection 114 on the inner portion 106 is used in coupling the antenna elements 108 and 110 to the RFID chip 102. The interconnection 114 includes a dual path between the chip 102 and the antenna element 108, around both sides of a central hole 116 of the disc 100.

Figure 10:
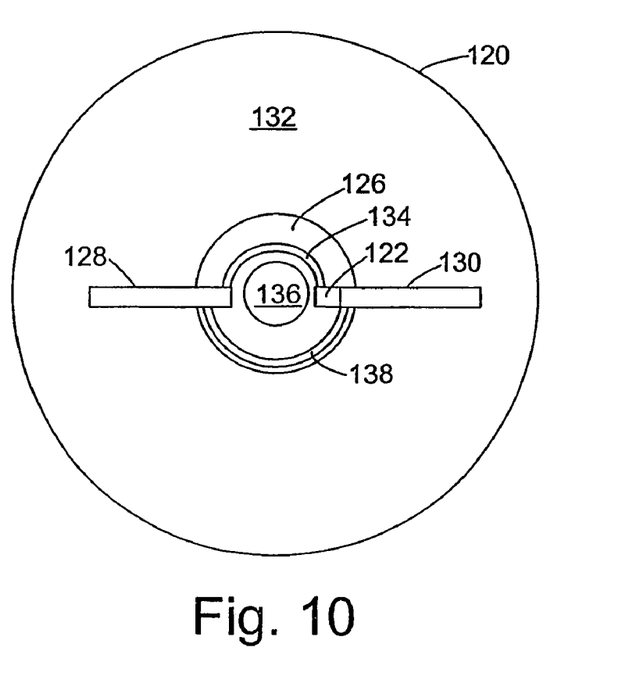
FIG. 10 is a plan view of yet another embodiment disc and RFID transponder antenna configuration in accordance with the present invention.

FIG. 10 illustrates a configuration that employs a shunt inductor. A disc 120 has an RFID transponder or chip 122 on an inner annular portion 126, and antenna elements 128 and 130 that extend onto an outer annular portion 132. The antenna element 128 is coupled to the chip 122 by a conductive interconnection 134 that is on the inner portion 126 on one side of a central hole 136.

A conductive shunt 138 couples the antenna elements 128 and 130 together. The shunt 138 acts as a shunt inductor between the antenna elements 128 and 130. The shunt 138 is on the inner portion 126, and runs along a side of the central hole 136 that is opposite to the side that the interconnection 134 is on. Thus the interconnection 134 and the shunt 138 are diametrically opposed on opposite sides of the central hole 136. However, it will be appreciated that other configurations of the interconnection 134 and the shunt 138 may be used.

Figure 11:
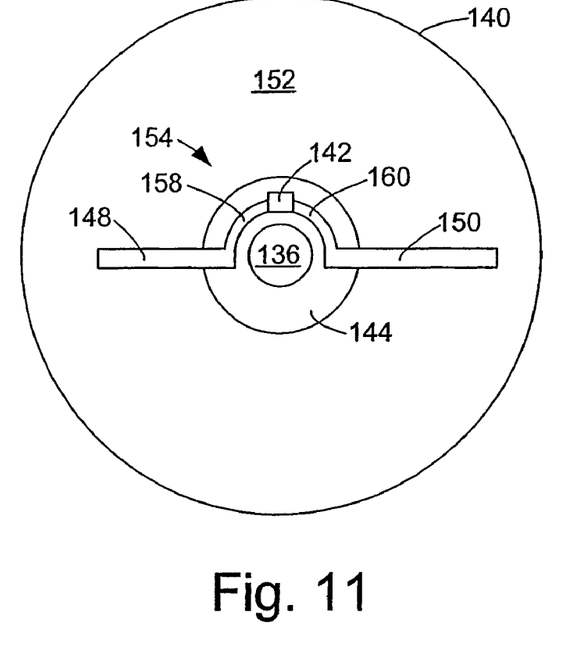
FIG. 11 is a plan view of still another embodiment disc and RFID transponder antenna configuration in accordance with the present invention.

FIG. 11 shows a configuration with a disc 140 having an RFID transponder or chip 142 on an inner annular portion 144, with the chip 142 centrally located substantially equidistant between antenna elements 148 and 150 that extend onto an outer annular portion 152 of the disc 140. An interconnection 154 on the inner portion 144 includes a pair of interconnection portions 158 and 160. The interconnection portion 158 couples the antenna element 148 to the chip 142. Similarly, the interconnection portion 160 couples the antenna element 150 to the chip 142. The interconnection portions 158 and 160 may have substantially the same length, and may have substantially the same electrical characteristics. Since the antenna elements 148 and 150 may be substantially identical, and may have substantially identical electrical characteristics, the operating characteristics of the RFID system may be substantially balanced on both sides of the chip 142.

Figure 12:
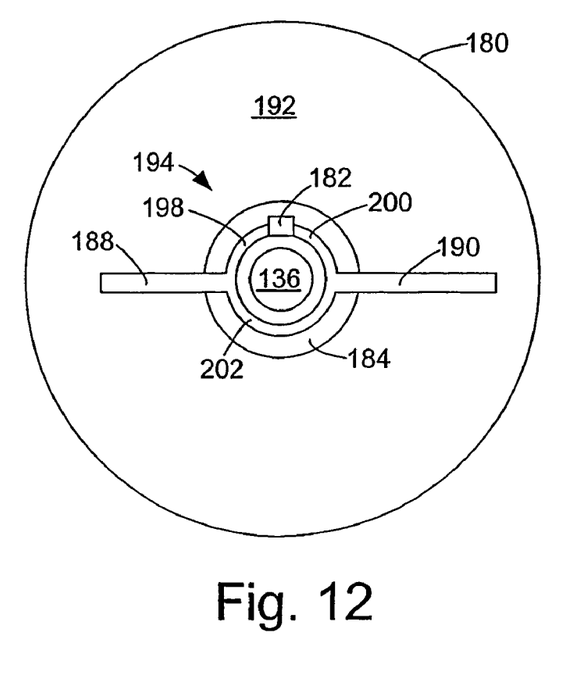
FIG. 12 is a plan view of a further embodiment disc and RFID transponder antenna configuration in accordance with the present invention.

FIG. 12 shows a disc 180 that has a configuration that combines the balanced characteristics of the disc 140 (FIG. 11) with the shunt configuration of the disc 120 (FIG. 10). The disc 180 has a centrally-located RFID transponder or chip 182 on an inner portion 184, with antenna elements 188 and 190 that extend onto an outer portion 192 of the disc 180. The chip 182 and an interconnection 194 are on one side of a central hole 196 of the disc 180, with interconnection portions 198 and 200 coupling the chip 182 to respective antenna elements 188 and 190. A shunt 202 on an opposite side of the central hole 196 operates as a shunt inductor by coupling the antenna elements 188 and 190.

Figure 13:
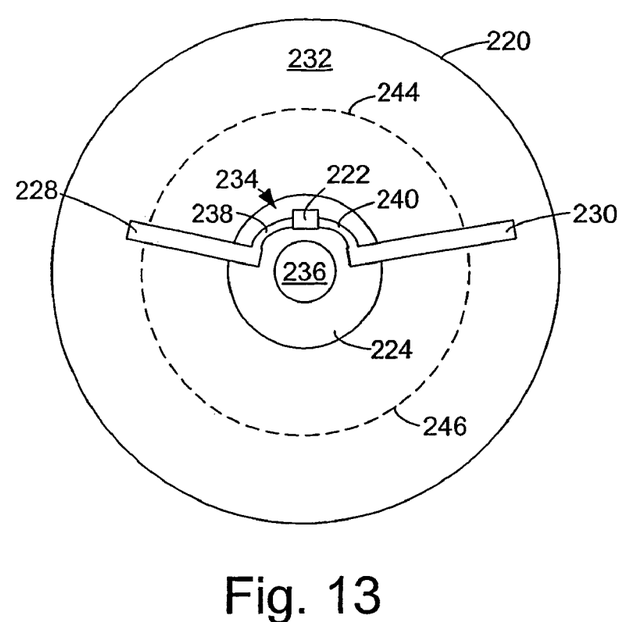
FIG. 13 is a plan view of a still another embodiment disc and RFID transponder antenna configuration in accordance with the present invention.

Turning now to FIG. 13, a disc 220 includes a transponder or chip 222 on an inner portion 224, and antenna elements 228 and 230 that extend onto an outer portion 232. The antenna elements 228 and 230 are coupled to the chip 222 by respective portions 238 and 240 of an interconnection 234. The antenna elements 228 and 230 may have different lengths, and may be not in line with one another across a central hole 236 of the disc 220. That is, the antenna elements 228 and 230 may be at an angle with regard to one another. Thus a path 244 between the antenna elements 228 and 230 through the outer portion 232 on one side of the central hole 236 has a different length than a path 246 between the elements 228 and 230 on the other side of the central hole 236. Having the two paths 244 and 246 be of different lengths allows the configuration to have a double resonance. The system may be configured so that the double resonance may be set so that the system may operate at different desired frequencies. For example, one of the paths may be configured such that the system may be operated in a band centered on 915 MHz, for use in the United States, and the other (longer) path arranged to act as an antenna at 869 MHz, for use in Europe.

Figure 14:
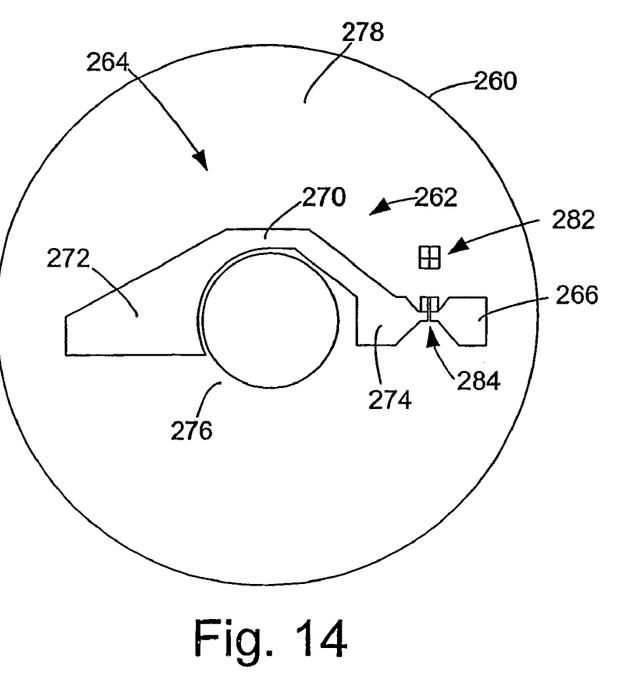
FIG. 14 is a plan view of a label having an antenna structure in accordance with the present invention.

FIG. 14 shows a label 260 with an antenna structure 262. The antenna structure 262 includes antenna elements 264 and 266 and a conductive material interconnect 270. The interconnect 270 couples together portions 272 and 274 of the antenna element 264. The interconnect 270 is primarily located on an inner annular portion 276 of the label 260 that is configured to overlie an inner annular portion of a disc when the label 260 is attached to the disc. The antenna elements 264 and 266 are primarily located on an outer annular portion 278 of the label 262 that is configured to overlie an outer annular portion of a disc when the label 260 is attached to the disc. Alignment marks 282 aid in positioning of a transponder at a mounting position 284, to couple the transponder or chip to the antenna elements 264 and 266.

Figure 15:
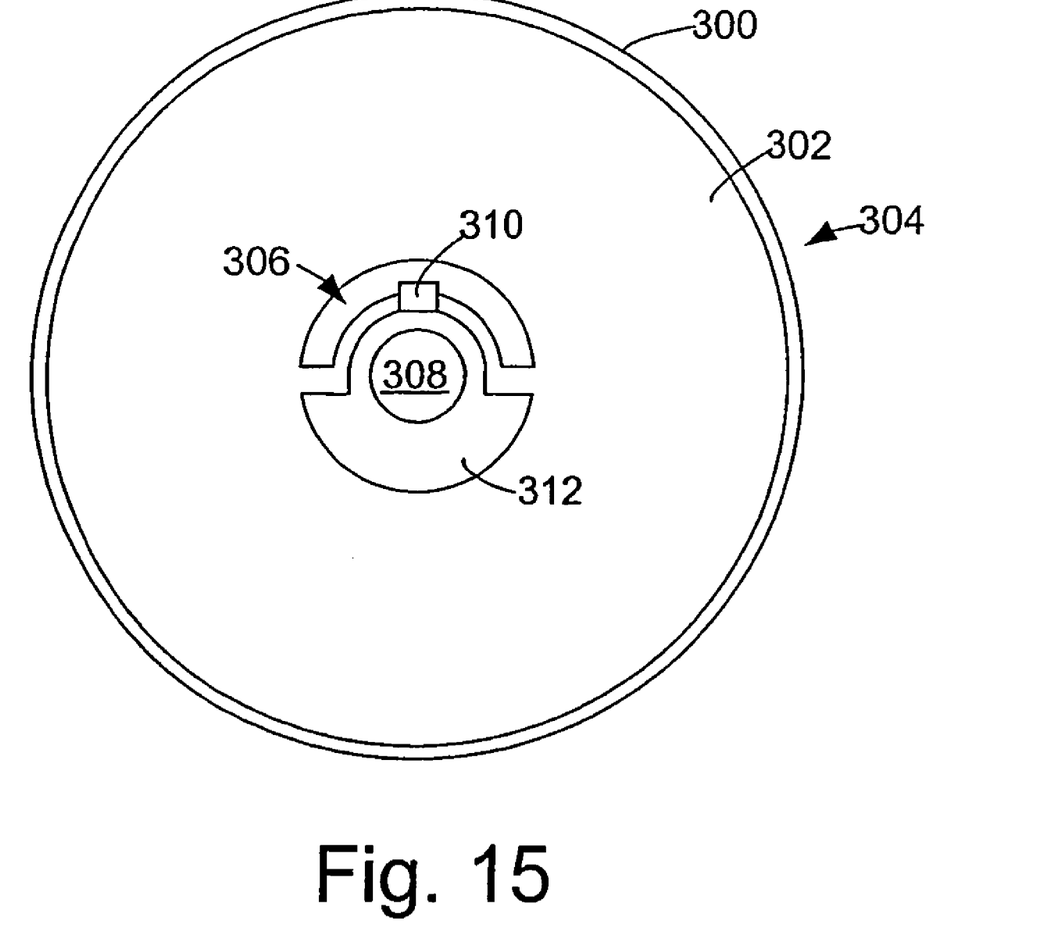
FIG. 15 is a plan view of disc having a built-in RFID system, in accordance with an aspect of the present invention.

FIG. 15 shows a disc 300 that has a built in RFID system. The disc 300 has an annular conductive material 302, such as a metallic reflective layer, in an outer annular portion 304. A conductive interconnect 306, on one side of a central hole 308 of the disc 300, is coupled to the annular conductive material 302, to allow the annular conductive material 302 to be coupled to a transponder 310, in the form of a chip or a strap or interposer. The conductive interconnect 306 is at least in part in an inner annular portion 312 of the disc 300, which is normally substantially free of conductive material. By electrically conductively coupling the transponder 312 to the annular conductive material 302, the annular conductive material 302 may be made to function as an antenna. This is a direct coupling of the transponder 310 to the disc's conductive material 302, in contrast to the capacitive coupling described above with regard to other embodiments.

The interconnect 306 may be a unitary and continuous part of the same conductive layer that includes the annular conductive material 302. The conductive traces of the interconnect 306 may be formed by a suitable masking process to produce the desired shape of conductive material.

It will be appreciated that many of the features described above with regard to the various capacitive coupling embodiments may also be utilized with direct coupling embodiments.

While the specification describes particular embodiments of the present invention, various alternatives may be employed without departing from the spirit and scope of the invention. Thus, by way of example and not of limitation, the transponder chip may be mounted centrally near the central hole with antenna stubs of equal length extending therefrom; the antenna stubs need not extend precisely along a single line; the inter-connection between the two antenna stubs may be formed by two parallel similar or different conductive paths on opposite sides of the central hole; with impedance matching in some cases requiring different conductor arrangements for optimum impedance matches.

Further, the impedance may be varied by changing the width of the conductor or conductors interconnecting the two antenna elements, or by shifting their positions in the inner zone of the disc. Accordingly the present invention is not limited precisely to the embodiments shown in the drawings and described in detail hereinabove.

The systems described herein may be used in any of a wide variety of applications. One possible use is for inventory of discs in a store. Another possible use is in identifying and tracking discs as they are moved between locations, such as in an office environment.

Another possible use is for verifying and preventing theft or unauthorized use of software. An RFID device on or in a disc of software being sold could be read at a point of sale such as a cash register or checkout. Data from the RFID device, such an EPC code, could then be transmitted to a manufacturer's website. There the data could be processed and authenticated, and a code could be returned to allow use of the software. The code, which could be printed on a sales receipt, for example, could be required by the customer in order to install and/or run the software. Use of such a system could facilitate prevention of theft, since possession of the disc alone, without going through the purchase process, would be of no value. In addition, such a system may aid in preventing counterfeiting, since authorization by the manufacturer may be required before completion of the purchase process. It will be appreciated that an automatic authorization process, such as that described above, may be preferable from the point of view of the consumer, since separate authorization steps may be avoided. Further, it will be appreciated that such a process may provide additional information to a seller that may otherwise not be available, for instance regarding times and locations of product sales.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An RFID system comprising:
   an annular disc having a central hole therein, and including an annular conductive material surrounding the central hole;
   a transponder; and
   antenna elements;
   wherein the antenna elements are electrically coupled to the transponder;
   wherein the antenna elements at least partially overlie the conductive material of the disc;
   wherein the antenna elements are capacitively coupled to the conductive material; and
   wherein radiant energy is coupled to and from the system primarily using the antenna elements and the annular conductive material.

2. The system of claim 1, wherein the disc includes:
   an outer annular portion that includes the annular conductive material; and
   an inner annular portion between the outer annular portion and the central hole;
   wherein the inner annular portion is substantially free of conductive material.

3. The system of claim 2, wherein the transponder is on the inner annular portion.

4. The system of claim 3,
   further comprising an interconnection of conductive material coupling the transponder and at least one of the antenna elements;
   wherein the interconnection is at least in part on the inner annular portion.

5. The system of claim 4, wherein the interconnection has a non-uniform width.

6. The system of claim 4, wherein the interconnection is along a pair of diametrically opposed sides of the central hole.

7. The system of claim 4, wherein the interconnection is only along one side of the central hole.

8. The system of claim 7,
   further comprising a shunt of conductive material that electrically couples the antenna elements together;
   wherein the shunt and the interconnection are on opposite, diametrically opposed, respective sides of the central hole.

9. The system of claim 4,
   wherein the transponder is located substantially equidistant from the antenna elements; and
   wherein the interconnection includes a pair of interconnection portions coupling respective of the antenna elements to the transponder.

10. The system of claim 2, wherein the antenna elements extend outward and terminate between one quarter and three quarters of the way across the outer annular portion.

11. The system of claim 1, wherein the antenna elements are angled relative to one another.

12. The system of claim 1, wherein the transponder and the antenna elements are parts of a label that is adhesively attached to the disc.

13. The system of claim 12,
    wherein the label includes:
      a base layer adhesively coupled to the disc; and
      a face stock layer overlying the base layer;
    wherein the antenna elements are between the base layer and the face stock layer; and
    wherein the label includes an adhesive layer for adhesively coupling the base layer to the disc.

14. The system of claim 13, wherein the transponder is in a recess in the base layer.

15. The system of claim 1, wherein the transponder and the antenna elements are mounted on the disc.

16. The system of claim 1, wherein the transponder and the antenna elements are inside the disc.

17. A label for use with an annular disc having a central hole therein, and including inner and outer annular portions surrounding the central hole, the outer annular portion having an annular conductive material, and the inner portion being substantially free of conductive material, the label comprising:
    a face stock layer;
    a transponder;
    antenna elements electrically coupled to the transponder;
    a base layer; and
    an adhesive layer attached to the base layer for adhesively coupling the label to the disc;
    wherein the antenna elements and the transponder are between the adhesive layer and the face stock layer; and
    wherein the antenna elements are substantially co-linear with one another, configured to be diametrically opposed on opposite sides of the central hole when the label is adhesively coupled to the disc.

18. The label of claim 17, wherein the transponder is in a recess in the base layer.

19. The label of claim 17, wherein the antenna elements are configured to extend outward and terminate between one quarter and three quarters of the way across the outer annular portion, when the label is adhesively coupled to the disc.

20. The label of claim 17, in combination with the disc.

21. A label for use with an annular disc having a central hole therein, and including inner and outer annular portions surrounding the central hole, the outer annular portion having an annular conductive material, and the inner portion being substantially free of conductive material, the label comprising:
    a face stock layer;
    a transponder;
    antenna elements electrically coupled to the transponder;
    a base layer; and
    an adhesive layer attached to the base layer for adhesively coupling the label to the disc;
    wherein the antenna elements and the transponder are between the adhesive layer and the face stock layer; and
    wherein the antenna elements are angled with respect to one another.

22. The label of claim 21, wherein the transponder is in a recess in the base layer.

23. The label of claim 21, wherein the antenna elements are configured to extend outward and terminate between one quarter and three quarters of the way across the outer annular portion, when the label is adhesively coupled to the disc.

24. The label of claim 21, in combination with the disc.

25. A label for use with an annular disc having a central hole therein, and including inner and outer annular portions surrounding the central hole, the outer annular portion having an annular conductive material, and the inner portion being substantially free of conductive material, the label comprising:
    a face stock layer;
    a transponder;
    antenna elements electrically coupled to the transponder;
    a base layer; and
    an adhesive layer attached to the base layer for adhesively coupling the label to the disc;
    wherein the antenna elements and the transponder are between the adhesive layer and the face stock layer; and further comprising an interconnection of conductive material conductively coupling the transponder and at least one of the antenna elements;
wherein the interconnection is configured to overlie the inner portion of the disc when the label is attached to the disc.

26. The label of claim 25, in combination with the disc.

27. A label for use with an annular disc having a central hole therein, and including inner and outer annular portions surrounding the central hole, the outer annular portion having an annular conductive material, and the inner portion being substantially free of conductive material, the label comprising:
   a face stock layer;
   a transponder;
   antenna elements electrically coupled to the transponder;
   a base layer; and
   an adhesive layer attached to the base layer for adhesively coupling the label to the disc;
   wherein the antenna elements and the transponder are between the adhesive layer and the face stock layer; and
   further comprising a conductive shunt that electrically couples the antenna elements together.

28. A label for use with an annular disc having a central hole therein, and including inner and outer annular portions surrounding the central hole, the outer annular portion having an annular conductive material, and the inner portion being substantially free of conductive material, the label comprising:
   a face stock layer;
   a transponder;
   antenna elements electrically coupled to the transponder;
   a base layer; and
   an adhesive layer attached to the base layer for adhesively coupling the label to the disc;
   wherein the antenna elements and the transponder are between the adhesive layer and the face stock layer; and
   wherein the antenna elements are configured to at least in part overlie the outer annular portion when the label is adhesively coupled to the disc, and to thereby capacitively couple to the annular conductive material of the disc.

29. The label of claim 28, in combination with the disc.

30. An RFID system comprising;
   an annular disc that includes;
      an inner annular portion surrounding a central hole; and
      an outer annular portion surrounding the inner annular portion; and
   a transponder;
   wherein the outer annular portion includes an annular conductive material;
   wherein the transponder is electrically coupled to the annular conductive material, such that the annular conductive material functions as at least part of an antenna structure in conjunction with the transponder; and
   wherein the transponder is directly electrically coupled to antenna elements that in turn are capacitively coupled to the annular conductive material.

* * * * *